(12) United States Patent
Kanigicherla et al.

(10) Patent No.: US 8,996,734 B2
(45) Date of Patent: Mar. 31, 2015

(54) I/O VIRTUALIZATION AND SWITCHING SYSTEM

(75) Inventors: Balaji Kanigicherla, Andhra Pradesh (IN); Siva Raghu Ram Voleti, Hyderabad (IN); Krishna Mohan Tandaboina, Hyderabad (IN)

(73) Assignee: Ineda Systems Pvt. Ltd, Hyderabad, Andhra Pradesh (IN)

( * ) Notice: Subject to any disclaimer, the term of this patent is extended or adjusted under 35 U.S.C. 154(b) by 36 days.

(21) Appl. No.: 13/817,822

(22) PCT Filed: Aug. 19, 2011

(86) PCT No.: PCT/IN2011/000558
§ 371 (c)(1),
(2), (4) Date: Feb. 19, 2013

(87) PCT Pub. No.: WO2012/023151
PCT Pub. Date: Feb. 23, 2012

(65) Prior Publication Data
US 2013/0151735 A1 Jun. 13, 2013

(30) Foreign Application Priority Data
Aug. 19, 2010 (IN) .......................... 2397/CHE/2010

(51) Int. Cl.
*G06F 3/00* (2006.01)
*G06F 13/364* (2006.01)
*G06F 13/10* (2006.01)
*G06F 9/44* (2006.01)

(52) U.S. Cl.
CPC ............ *G06F 13/364* (2013.01); *G06F 13/105* (2013.01); *G06F 9/4411* (2013.01)

USPC ............. 710/5; 710/2; 710/7; 710/20; 710/52

(58) Field of Classification Search
USPC ......................................... 710/5, 2, 7, 20, 52
See application file for complete search history.

(56) References Cited

U.S. PATENT DOCUMENTS 4,674,037 A * 6/1987 Funabashi et al. ............ 713/600
5,845,147 A * 12/1998 Vishlitzky et al. ................ 710/5
2002/0061012 A1 5/2002 Thi et al.

(Continued)

OTHER PUBLICATIONS

PCT International Search Report for PCT Counterpart Application No. PCT/IN2011/000558, 2 pgs. (Mar. 20, 2012).

(Continued)

*Primary Examiner* — Ernest Unelus
*Assistant Examiner* — Getente A Yimer
(74) *Attorney, Agent, or Firm* — Workman Nydegger (57) ABSTRACT

Described herein is a system (102) having a virtualization and switching system configured to virtualize I/O devices (108) and perform switching of the I/O devices (108) and I/O requests. The virtualization and switching system (102) includes a peripheral virtualization controller (PVC) (204), at least one device control module (206) connected to the PVC (204), and at least one command parser (210). The PVC (204) is configured to manage I/O virtualization and I/O command access of different I/O devices (108). The device control module (206) is configured to store configuration and I/O device registers, implemented by the PVC (204) to enable virtualization of I/O devices (108). The device control module (206) also implements the I/O command and switching logic to perform graceful handling of the I/O commands and virtualized I/O devices between multiple host processors (104).

18 Claims, 5 Drawing Sheets

(56) References Cited

U.S. PATENT DOCUMENTS

| | | |
|---|---|---|
| 2002/0154646 A1 | 10/2002 | Dubois et al. |
| 2003/0101440 A1 | 5/2003 | Hardin et al. |
| 2005/0066060 A1 | 3/2005 | Pinkerton et al. |
| 2005/0226201 A1 | 10/2005 | McMillin |
| 2006/0075176 A1* | 4/2006 | Okamoto .................... 710/305 |
| 2006/0104308 A1 | 5/2006 | Pinkerton et al. |
| 2007/0266179 A1* | 11/2007 | Chavan et al. ............... 709/250 |
| 2008/0147943 A1 | 6/2008 | Freimuth et al. |
| 2009/0043921 A1* | 2/2009 | Roy ............................... 710/31 |
| 2010/0036995 A1* | 2/2010 | Nakayama et al. ........... 710/316 |
| 2012/0185632 A1* | 7/2012 | Lais et al. .................... 710/308 |

OTHER PUBLICATIONS

Written Opinion of the International Search Authority for PCT Counterpart Application No. PCT/IN2011/000558, 5 pgs. (Mar. 20, 2012).

PCT Notification of Transmittal of International Preliminary Examination Report for PCT Application No. PCT/IN2011/000558, 6 pgs. (Feb. 19, 2013).

\* cited by examiner

I/O VIRTUALIZATION AND SWITCHING SYSTEM

CROSS-REFERENCE TO RELATED APPLICATIONS

This patent application is a U.S. National Phase Application under 35 U.S.C. §371 of International Application No. PCT/IN2011/000558, filed Aug. 19, 2011, entitled I/O VIRTUALIZATION AND SWITCHING SYSTEM, which claims priority to India Patent Application No. 2397/CHE/2010, filed Aug. 19, 2010.

TECHNICAL FIELD

The present subject matter, in general, relates to I/O virtualization and in particular to I/O device virtualization for multi-host processors.

BACKGROUND

To meet the growing demands of homes and offices, virtualization technology is being extensively used in computing systems. In general, the virtualization technology allows a platform to run multiple operating systems (also referred to as system images) and applications in independent partitions. In other words, one computing system with virtualization can function as multiple "virtual" systems. Furthermore, each of the virtual systems may be isolated from each other and may function independently.

In the recent past, virtualization has also been extended to cover I/O virtualization. I/O virtualization is a methodology which transforms accesses between standard I/O devices and host processors such that the I/O devices can be shared across multiple system images or hosts in a way which hides the sharing from both the host processor and the shared I/O devices. In systems supporting I/O virtualization, address remapping is generally used to enable assignment of the I/O devices to the host processor.

Generally, the I/O devices are virtualized by software such as a hypervisor. The hypervisor or a virtual machine monitor (VMM) provides a platform for isolated execution of system images and manages access between the system images and the attached I/O devices. Standards for PCIe based I/O virtualization, where multiple system images are implemented on a single host processor, are specified by Peripheral Component Interconnect Special Interest Group (PCI-SIG) in the single root input-output virtualization (SR-IOV) standard. The capabilities of the SR-IOV standard have been extended by a multi root input-output virtualization (MR-IOV) standard to allow virtualization of the I/O devices between multiple host processors based on the standards of MR-IOV provided by the PCI-SIG.

The PCI-SIG further defines MRIOV specifications which are extensions to the PCIe specifications to be implemented by an MRIOV switch to enable I/O device sharing between multiple non-coherent Root Complexes (RC). In a Multi Root PCIe environment, multiple RCs maintain their own PCIe domain which consists of one or more MRIOV aware switches and attached I/O devices, called a virtual hierarchy (VH). An MRIOV aware PCIe switch supports one or more upstream ports and associated VHs. With multiple RCs and several I/O devices, an MRIOV aware switch has to implement multiple VHs and functionalities. Further, with such technology enabling multiple functionalities on a single hardware platform, and hardware platforms becoming more and more portable, the power consumption and the silicon area utilized by increased components like MRIOV aware switch on the hardware platform increases.

SUMMARY

This summary is provided to introduce concepts related to a virtualization and switching system, which are further described in the detailed description. This summary is not intended to identify essential features of the present intended subject matter nor is it intended for use in determining or limiting the scope of the present subject matter.

In one implementation, a method for virtualization and switching of the I/O devices includes initializing one or more of at least one configuration register set, and at least one device register set for a I/O device corresponding to each of a plurality of host processors. The method further includes providing the initialized configuration registers and the device registers to the plurality of host processors for virtualization of the I/O device.

In another implementation, the virtualization and switching system (VSS) includes at least one device control module configured to implement at least one of configuration register set and at least one device register set for a I/O device corresponding to one or more virtual hierarchies, wherein the virtual hierarchies are associated with a plurality of host processors. The VSS system may also include at least one command parser coupled to the at least one device control module configured to identify command boundaries of requests from the plurality of host processors based on packet header of the requests. In one implementation of the present subject matter, the VSS may further include a peripheral virtualization controller (PVC) coupled to the at least one device control module configured to manage virtualization of the connected I/O device.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features acrd components.

DETAILED DESCRIPTION

The present subject matter is based on the PCI Express (PCIe) based virtualization and more specifically to managing virtualization of I/O devices in a system having multiple host processors.

In general, I/O virtualization relates to a capability of the I/O devices to be used by more than one system image, in other words, by more than one operating system executing on a single host processor. Conventionally, a virtualization intermediary (VI) or a hypervisor, such as a virtual machine monitor (VMM), is used to enable sharing of the I/O devices connected to the single host processor. For a single root I/O virtualization, where multiple system images work on a single host processor and share virtualized I/O devices, a single root input-output virtualization (SR-IOV) standard has been developed by the Peripheral Component Interconnect Special Interest Group (PCI-SIG).

Additionally, the standard for virtualizing I/O devices and further, routing information between the virtualized I/O devices and the multiple host processors based on PCIe protocol has been defined by the PCI-SIG in the multi-root I/O virtualization (MR-IOV) standard. This MR-IOV standard defines the architecture which enables multiple hosts to interact with I/O devices through a common I/O device controller. The MR-IOV standard also defines MR-IOV switch which enables multiple hosts to interact with multiple I/O devices that are PCIe compliant. In such architecture, each host is provided with a unique virtual view of the I/O device, or its I/O controller.

Each of these per host virtual view of the I/O devices is referred to as virtual hierarchy hereinafter. The MR-IOV standard defines a MR-PCI manager (MR-PCIM) which sets up different virtual hierarchies before the boot of any of such hosts. Once the MR-PCIM initializes the switch, the host start accessing PCIe device directly. It should be noted that although the PCI-SIG's MR-IOV standard describes the components required for enabling the virtualization in the PCIe domain, however the standard does not define the method and manner in which the virtualization can be implemented by the I/O device controller. For instance, the virtualization of I/O devices can be achieved by software implementations or by hardware systems or by a combination thereof.

To successfully implement virtualization of the I/O devices, device specific functionalities are to be implemented and managed. For example, memory mapped I/O registers, programming sequence, switching sequences, etc., are to be treated differently for different I/O devices. In other words, the I/O virtualization for a storage device is different from the I/O virtualization for a network interface. Since for a device controller, the MR-IOV standard only discusses about the PCIe configuration space and required set of registers to be implemented to enable virtualization, embodiments are described herein to handle virtualization of the I/O devices through the device controller in a multi-host environment and allow graceful handling and switching of the I/O devices from one host processor to the other host processor.

To this end, in one embodiment, a virtualization and switching system includes a peripheral virtualization controller (PVC), at least one device control module connected to the PVC, and least one command parser. The PVC is configured to manage I/O virtualization and I/O command access of different I/O devices. The device control module is configured to store configuration and I/O device register set per host to enable virtualization of the connected I/O devices. The device control module also implements the I/O command and switching logic to perform graceful handling of the I/O commands and virtualized I/O devices. In an embodiment, the virtualization and switching system may also include an interrupt controller connected to at least one I/O device and the PVC configured to process and route interrupts generated by the I/O devices to different host processors. In another embodiment, the virtualization and switching system may also include a message handling module configured to exchange information between a multi-root aware switch and the I/O devices through the PVC. Further, the VSS may include SRAM and ROM configured to have programming provisions from a BIOS/BSP or an external or internal storage element.

Devices that can implement the disclosed system(s) and method(s) include, but are not limited to, desktop computers, hand-held devices, multiprocessor systems, microprocessor based programmable consumer electronics, laptops, network computers, minicomputers, mainframe computers, and the like.

Figure 1:
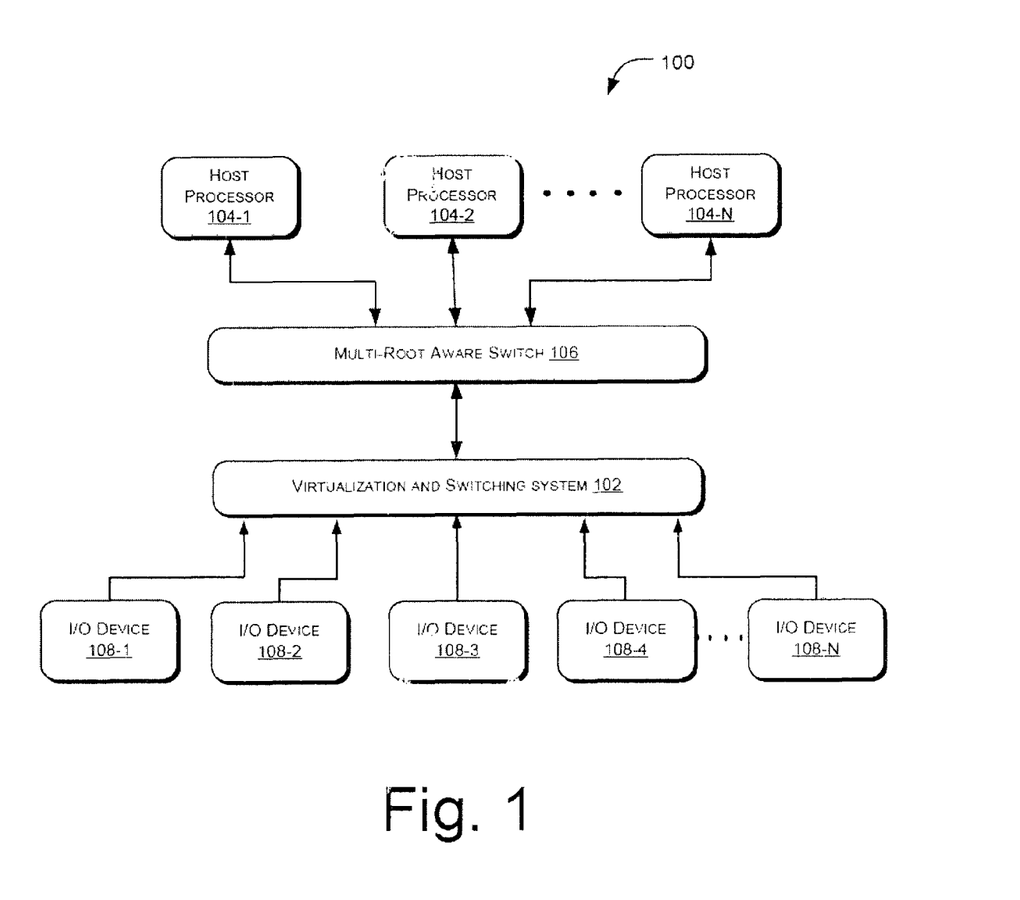
FIG. 1 illustrates an exemplary system implementing a virtualization and switching system, in accordance with an embodiment of the present subject matter.

FIG. 1 illustrates a system 100 implementing a virtualization and switching system (VSS) 102, hereinafter referred to as the system (102) according to an embodiment of the present subject matter. In said embodiment, the system 100 includes host processors 104-1, 104-2, ..., 104-N, collectively referred to as host processors 104. The system 100 further includes a multi-root aware (MRA) switch 106 and I/O devices 108-1, 108-2, ... 108-N, collectively referred to as I/O device(s) 108. Examples of the I/O devices 108 include USB devices, storage devices, communication devices, human interface devices, audio devices, etc. The I/O devices 108 may either be aware of multi-root input-output virtualization (MRIOV) or unaware of MRIOV. An MRIOV aware I/O device is generally capable of implementing different control and configuration registers for multiple host processors 104 and hence, does not require virtualization by an external system like the VSS 102. However, the MRIOV unaware I/O devices, such as legacy PCIe devices, are virtualized using the VSS 102. For the purpose of illustration only, the I/O device 108-1 is an MRIOV aware I/O device and the I/O device 108-2 is an MRIOV unaware device.

The host processors 104 may include microprocessors, microcomputers, microcontrollers, digital signal processors, central processing units, state machines, logic circuitries, and/or any devices that manipulate signals and data based on operational instructions. Among other capabilities, the host processors 104 are individually configured to interact with the MRA switch 106 through their respective root complexes (not shown in the figure). Further, the MRA switch 106 is based on the PCI-SIG specifications and is configured to route information between different host processors 104 and the VSS 102.

In operation, the VSS 102 enables virtualization of the I/O devices 108 such that the I/O devices 108 appear to be exclusively assigned to the host processors 104. Additionally, the VSS 102 implements functions, such as virtual functions, base functions, and physical functions. Such functions are defined in the PCI-SIG's SRIOV and MRIOV specifications. In one embodiment, the VSS 102 also gracefully switches control of the I/O devices 108 from one host processor, say host processor 104-1, to another host processor, e.g., host processor 104-2 in a pre-defined time frame so as to provide seamless user experience. This is further explained with reference to the subsequent figures.

Figure 2A:
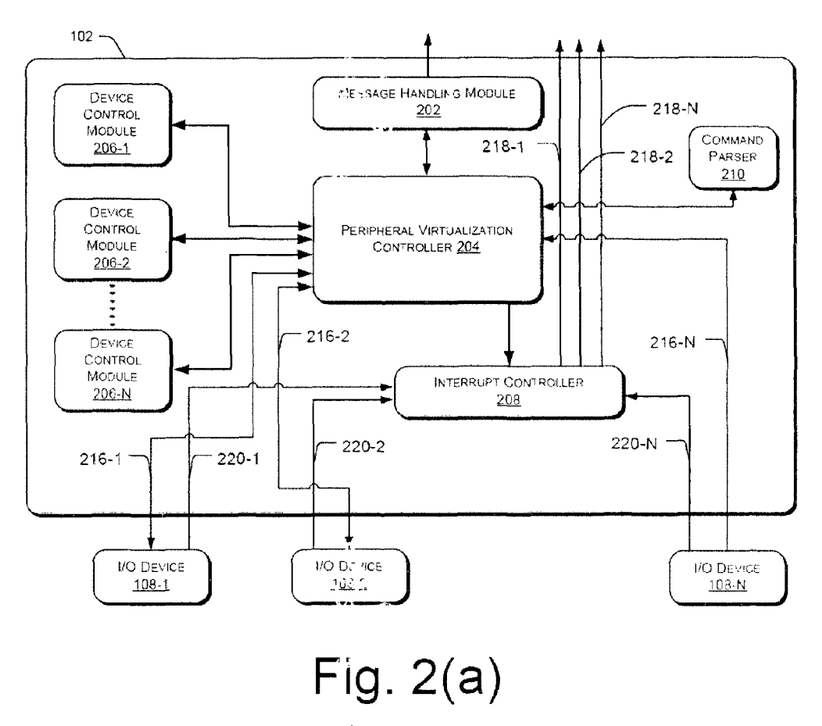
FIG. 2(a) illustrates an exemplary virtualization and switching system, in accordance with an embodiment of the present subject matter.
Figure 2B:
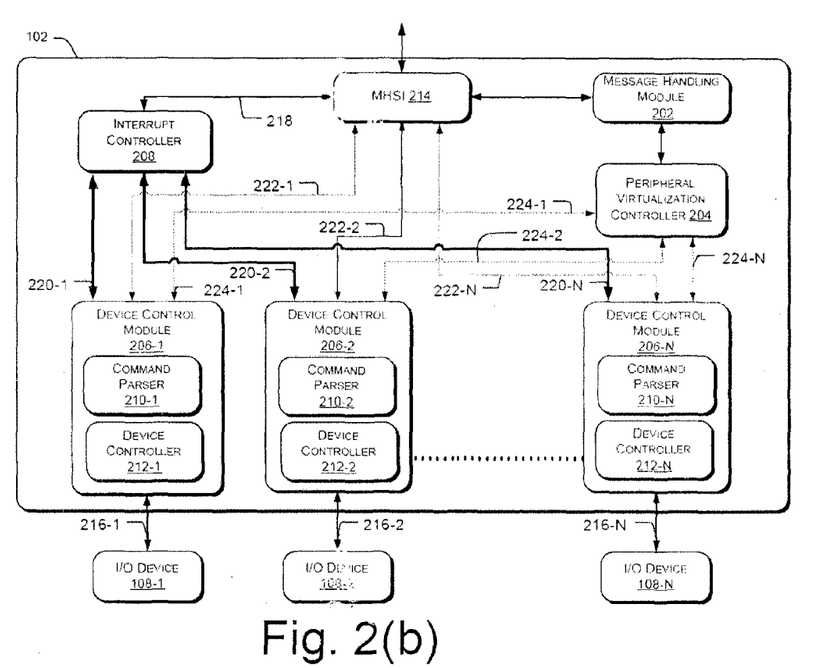
FIG. 2(b) illustrates an exemplary virtualization and switching system, in accordance with another embodiment of the present subject matter.

FIG. 2 (*a*) and FIG. 2 (*b*) illustrates different architectures of the exemplary VSS 102 or the system 102, in accordance with different embodiments of the present subject matter. Referring to FIG. 2 (*a*) in said embodiment, the VSS 102 includes a peripheral virtualization controller (PVC) 204 configured to manage I/O virtualization, implement switching functions when required and perform code execution to run user defined sequences, such as I/O command access, for the I/O devices 108. The PVC 204 can be implemented by a state machine, a microcontroller, a programmable processor, logic circuitries, and/or any devices that manipulate signals and data based on operational instructions. Additionally, in one implementation, the PVC 204 may include a memory such as an SRAM and/or ROM (not shown in the figure). Alternatively, the memory may be external to the PVC 204.

In said embodiment, the VSS 102 also includes device control module 206-1, 206-2, . . . , 206-N, collectively referred to as device control module(s) 206. The device control modules 206, in one implementation, are included in the memory space within the PVC 204. In another case, the device control modules 206 may be included in another dedicated memory. The device control modules 206 are configured to store configuration and control register sets, such as PCI configuration registers, device host adapter registers, memory mapped IO (MMIO) registers, etc., specific to the each of the I/O devices 108 and the host processors 104. Further, the device control modules 206 also include device specific switching logic unit (not shown in the figure) which enables the PVC 204 to switch the I/O devices 108 from one host processor 104-1 to another host processor 104-2. The details of the switching mechanism are described later in the explanation.

Generally, the I/O device 108, when connected to the host processor 104-1 (as shown in FIG. 1), sends a connect request based on the protocol at which the I/O device 108 operates. For this, the I/O devices 108 are connected to the PVC 204 through their respective connected bus 216-1, 216-2, . . . , 216-N, collectively referred to as buses 216. The buses 216 can be implemented by an Advanced Extensible Interface (AXI) bus, an Advanced High Performance Bus (AHB), a Peripheral Connect Interface (PCI) bus, a PCI Express bus, etc. In operation, the PVC 204 captures all connect requests and sends these requests to the desired host processors 104. Subsequently, each of the host processors 104 enumerates all the I/O devices 108 and the VSS 102 snoops the enumeration process for each I/O device 108 and programs the I/O device registers with specific enumeration values. The PVC 204 stores the enumerated register values such as the configuration registers and the I/O device registers corresponding to the particular I/O device, thereby enabling I/O device virtualization.

As an illustration, consider that two host processors 104-1 and 104-2 are connected to the I/O device 108-1. The I/O device 108-1 sends a connect request in a particular protocol format through the connected bus 216-1. Further, the PVC 204 captures the connect request sent by the I/O device 108-1 and subsequently, sends the connect request to either of the two host processors 104-1 or 104-2. For example, the PVC 204 sends the connect request to the host processor 104-2. The host processor 104-2 enumerates the I/O device 108-1 and programs the I/O device 108-1 with specific enumeration values.

In one implementation, the PVC 204 captures information sent by the host processor 104-2 and stores the enumerated register values corresponding to host processor 104-2. Subsequently, the PVC 204 sends the connect request sent by the I/O device 108-1 to host processor 104-1. The PVC 204 again stores the enumerated registers values corresponding to host processor 104-1 for the I/O device 108-1. Since both the host processors can access the enumerated configuration and program registers of the I/O device 108-1 stored and shared by the VSS 102, the device is virtually attached to both the host processors 104-1 and 104-2.

In one embodiment, if the host processor 104-1 and the host processor 104-2 enumerate the I/O device 108-1 one after other and share the I/O device 108-1 simultaneously thereafter, the VSS 102 re-enumerates the I/O device 108-1 without the knowledge of the host processors 104-1 and 104-2 before handing the I/O device 108-1 over to the host processor 104-1 and the host processor 104-2 respectively from the other host processors 104.

In another embodiment, the VSS 102 may emulate disconnect and re-connect events to switch the I/O device 108-1 between the host processor 104-1 and the host processor 104-2. For instance, if the host processor 104-1 is accessing the I/O device 108-1 and if a system an application requires the I/O device 108-1 to be handed over to the host processor 104-2, the VSS 102 will determine a transaction boundary to seamlessly disconnect the I/O device 108-1 from the host processor 104-1 and will emulate an I/O device disconnect event corresponding to the I/O device 108-1 with the host processor 104-1. Once the disconnect procedure is complete between the host processor 104-1 and the I/O device 108-1, the VSS 102 will emulate a device connect event corresponding to the I/O device 108-1 with the host processor 104-2.

Although the virtualization is explained with respect to multiple host processors, it will be appreciated by a person skilled in the art that in absence of multiple host processors and several system images, the connect and disconnect requests are not trapped by the PVC 204 and a direct I/O access is given to the host processors 104 requesting for the available I/O devices 108. Although only a few sharing and switching methods are discussed, alternate procedures may also exist as can be perceived by person skilled in art.

In one embodiment, the VSS 102 also includes an interrupt controller 208 to handle interrupts generated by the I/O devices 108. To this end, the I/O devices 108 are connected to the interrupt controller 208 through interrupt bus 220-1, 220-1, . . . , 220-N, collectively referred to as interrupt buses 220. As mentioned earlier, the interrupt buses 220 can be a custom signal interface or any of the bus protocols such as an AXI bus, an AHB bus, a PCI bus, a PCIe bus, etc. The interrupt controller 208 may receive multiple interrupts from the I/O devices 108 in situation where one or more I/O devices 108 generate simultaneous interrupts. Interrupt signals can be generated due to many reasons like I/O device failure, data corruption, etc.

In another implementation, the device control modules 206 are further configured to initialize configuration register set, and device register set for a I/O device. The implemented configuration register set and the device register set register sets may correspond to a host processor 104 from amongst several host processors 104. Further, the device control modules 206 may provide the initialized configuration registers and the device registers to the host processors 104 for virtualization of the I/O device 108.

Further, according to another implementation, the device control module 206 is also configured to share the I/O devices parally between the host processors 104. The device control module 206 may assign an I/O device 108 to a first host processor from amongst the several host processors 104 to process a first request from the first host processor. The device control module 206 may also receive a second request from a second host processor from amongst the several host processors (104) for the I/O device (108) and may arbitrate between the first request and the second request to select the second request based on the command boundary of the first request. The arbitration may be done during the processing of the first I/O request and the device control module 206 may then assign the I/O device 108 to the second host processor to process the second request where the I/O device 108 is simultaneously shared between the first host processor and the second host processor. It would be understood by those skilled in the art that the device control module 206 may again arbitrate to switch the I/O device from the second host processor to the first host processor based on the command boundary of the second request.

In operation, the interrupt controller 208, after receiving an interrupt from the I/O device 108, processes the interrupt by determining the host processor 104 to which the interrupt is addressed. The interrupt controller 208 also determines information within the interrupt and accordingly, routes the interrupt to the desired host processor 104. As an illustration, consider that the I/O device 108-1 sends an interrupt, referred to as interrupt A, to the host processor 104-1 through the interrupt bus 220-1. Simultaneously, the I/O device 108-2 sends an interrupt, referred to as interrupt B, to the host processor 104-2 through the interrupt bus 220-2. In such a scenario, the interrupt controller 208 captures both the interrupts, namely interrupt A and interrupt B, and processes the interrupts to ascertain the information regarding the host processors 104 to which the interrupts are addressed and also determines the information, such as command state, within the interrupt. The interrupt controller 208 then routes the interrupt A to the host processor 104-1 through a connect bus 218-1 and interrupt B to the host processor 104-2 though a connect bus 218-2.

In another embodiment, the VSS 102 also includes a message handling module 202 to enable communication between the host processors 104 and the PVC 204. The message handling module 202 facilitates in exchanging data such as state information of any of the I/O devices 108, acknowledgement of any information transfer, work completion status, etc., between the PVC 204 and the host processors 104.

In an embodiment, the host processors 104 also send commands, such as read data from memory, print a document, etc., for the I/O devices 108. Such commands are also routed to the VSS 102, which includes a command parser 210. The command parser 210 is configured to identify command boundaries by inspecting the received command packet headers. The command sequence may vary for different devices, for example an SCSI command block (SCB) is used by the USB mass storage devices to exchange information. Based on an output of the command parser 210, the PVC 204 handles switching of commands for the I/O devices 108 between different host processors 104. Such switching is desired when the VSS 102 receives multiple commands from different host processors 104 for a particular I/O device 108.

As an illustration, consider a virtualized I/O device 108-1 to be a storage device, such as a Serial Advanced Technology Attachment (SATA) device. As mentioned previously, while virtualizing the I/O device 108-1, the configuration registers and the I/O device registers are initialized by the VSS 102 in the device control module 206. The host processor 104-1 sends a memory read command using direct memory access (DMA), for example command A for the I/O device 108-1. Subsequently, the host processor 104-2 sends another memory read command using DMA, for example command B for the same I/O device 108-1. In such a scenario, both the host processors 104-1 and 104-2, program the SATA device registers and the command registers for the I/O device 108-1, already shadowed in the VSS 102 and stored in the device control module 206. Further, the PVC 204 arbitrates between the two read commands, command A and command B, based on an arbitration protocol such as round robin. In an embodiment, the host processor 104-1 is selected after arbitration and a SATA controller (not shown in the figure) for the I/O device 108-1 is programmed for the host processor 104-1. In one example, the SATA controller of the I/O device 108-1 builds a frame information structure (FIS) between the host processor 104-1 and the I/O device 108-1. Further, the I/O device 108-1 sends the data required to the host processor 104-1. On completion, the command parser 210 identifies the Advanced Technology Attachment (ATA) command boundary and sends a signal to the PVC 204. The PVC again initiates the arbitration and now the host processor 104-2 performs the read operation.

It should be noted that arbitration performed by the PVC 204 is not limited only to SATA storage devices and implementation on other devices such as communication device, audio device, human interface device, etc., may be possible as will be understood by a person skilled in the art.

The VSS 102 in one embodiment also supports high availability features like watch dog timers, error recovery mechanisms per host and per I/O device, host to I/O device connectivity reset capability (for recovering from system hangs) etc. For example, when a particular device such as a USB fails to respond during the device switching, watch dog timer interrupts the VSS 102 and performs an error recovery mechanism, such as reinitializing the device before switching to the other host processor.

The PVC 204, in one embodiment, also supports a Multi Root Peripheral Connect Interface Manager (MR-PCIM) capability required by the MRA switch 106. In this case, the PVC 204 sets up the virtual hierarchies required for the system virtualization even before the host processors 104 start the PCI enumeration process.

Referring to FIG. 2(*b*), according to yet another embodiment of the present subject matter, the device control modules 206 may control the virtualization and arbitration of the commands. The VSS 102 may include command parser 210-1, 210-2, . . . , 210-N corresponding to each device control module 206. The command parser 210-1, 210-2, . . . , 210-N are collectively referred to as command parser 210. The device control modules 206-1, 206-2, . . . , 206-N may directly interact with the I/O devices 108 through the described connections 216-1, 216-2, . . . , 216-N, respectively.

In such an embodiment, the VSS 102 may also implement a Multi-Host Switch Interface (MHSI) 214 to interact with the multi root aware switch 106. The MHSI 214 may be configured to directly route the information between the device control modules 206 and the multi root aware switch 106 through the connections 222-1, 222-2, . . . , 222-N. In said implementation, the MHSI 214 may act as an interface between the message handling module 202, the interrupt controller 208, the device control modules 206, and the multi root aware switch 106. The MHSI 214 may, among other things, route the interrupts generated by the interrupt controller 208 to the corresponding host processor 104 through the connection 218, route the commands originating from the host processors to the I/O devices 108 either through the message handling module 202 or through the device control modules 206, and also route DMA requests/Commands requests directly received by the device control module 206 from the I/O devices 108 to the respective host processors 104.

As described above, in said implementation, the device control module 206 may directly receive data or command from the I/O device 108 as well as the host processor 104. Further, the device control module 206 may initiate a direct transfer of the data or command between the host processors 104 and the I/O devices 108 through the configuration register set and the device control register set.

As described earlier, the device control module 206 may still include the configuration and control registers corresponding to each I/O device 108 and corresponding to different virtual hierarchies for different host processors 104. Further, in said implementation, the device control modules 206 may also include the switching logic unit (not shown) configured to manage I/O virtualization, implement switching functions when required, and perform code execution to run user defined sequences, such as I/O command access, for the I/O devices 108.

For this purpose, each device control module 206 may include a command parser 210 for each I/O device 108. For example, the device control module 206-1 may include a command parser 210-1 corresponding to the I/O device 108-1, the device control module 206-2 may include a command parser 210-2 corresponding to the I/O device 108-2, and the device control module 206-N may include a command parser 210-N corresponding to the I/O device 108-N. In said implementation, the PVC 204 may communicate with the host processors 104 through the message handling module 202 and may initiate the switching of an I/O device 108 through the switching logic unit of device control module 206.

For example, according to the said implementation, if an I/O device 108-1 is exchanging information from the host processor 104-1, and the host processor 104-2 sends an access request for the same I/O device 108-1, the MHSI 214 may directly route the access request of the host processor 104-2 to the device control module 206-2. The switching logic unit of the device control module 206-2 may subsequently notify the PVC 204 of such an access request, and based on the command parser's 222-2 identification of the command boundaries, switch the control of the I/O device 108-1 from the host processor 104-1 to the host processor 104-2.

It would be understood by those skilled in the art that the device control module 206 may be a combination of hardware and logic means implemented to achieve the described functionality, and may include one or more physical blocks to implement different functions and logics.

Apart from acting as in interface for the information exchange between the MHSI 214 and the I/O devices 108 and vice-versa, to effectively manage I/O virtualization, the device control modules 206 are also configured to resolve the destination of interrupts originating from the I/O devices 108. Thereby, instead of receiving interrupts directly, in said implementation, the interrupt controller 208 receives different interrupts for different host processors from each device control module 206. Further, the interrupt controller 208 may handle the interrupt and route it to the corresponding host. It would be appreciated that other functions such as conversion of the interrupt signals to different PCIe messages based on the interrupt request types received from the device control modules 206 are carried out by the interrupt controller 208.

In another implementation, the message handling module 202 may raise interrupts for a host processor 104 when the PVC 204 generates a message for the corresponding host processor 104. In such a situation, the raised interrupt is routed by the interrupt controller 208 to the corresponding host processor 104 and the message handling module 202 acts as a PCI/PCIe function for the host processor 104 with the generated message being stored with the message handling module 202. Similarly, the messages generated by the host processors 104 for the PVC 204 may be routed through the message handling module 202 and based on such an occurrence, the message handling module 202 may intimate the interrupt controller 208 to raise an interrupt for the PVC 204. As would be understood by those skilled in the art that the message of the host processor 104, for the PVC 204 can directly be forwarded by the message handling module 202 without an interrupt being generated by the interrupt controller 208.

In yet another implementation of the present subject matter, PVC 204 is configured to transition into the turn-off state only upon a determination that only a single host processor 104 is in active state and the turn-off even has been initiated by the same host processor 104. For example the PVC 204 receives a request of turn-off event from a host processor 104-2. Upon occurrence of such an event, the PVC 204 would determine if any host processor 104, other than the host processor 104-1 is active. In case a host processor 104-2 is still active, the PVC 204 would trap the turn-off request of the host processor 104-1 and send an acknowledgement without transitioning the I/O device 108 to turn-off state. Since the other active host processor 104-2 may still be utilizing the I/O device 108, the I/O devices 108 are kept in active state without being transitioned into turn-off state upon the request of the host processor 104-1. However, in a situation where no host processor other than the host processor 104-1 is in active state, the PVC 204 may transition into the turn-off state.

Although, the functionally of I/O virtualization and peripheral control has been described in reference to the I/O devices 108 carried out by either the PVC 204 or the device control modules 206, however it would be understood by those skilled in the art that the functionality can be implemented by different bocks or modules configured to perform the similar functions described above.

Figure 3A:
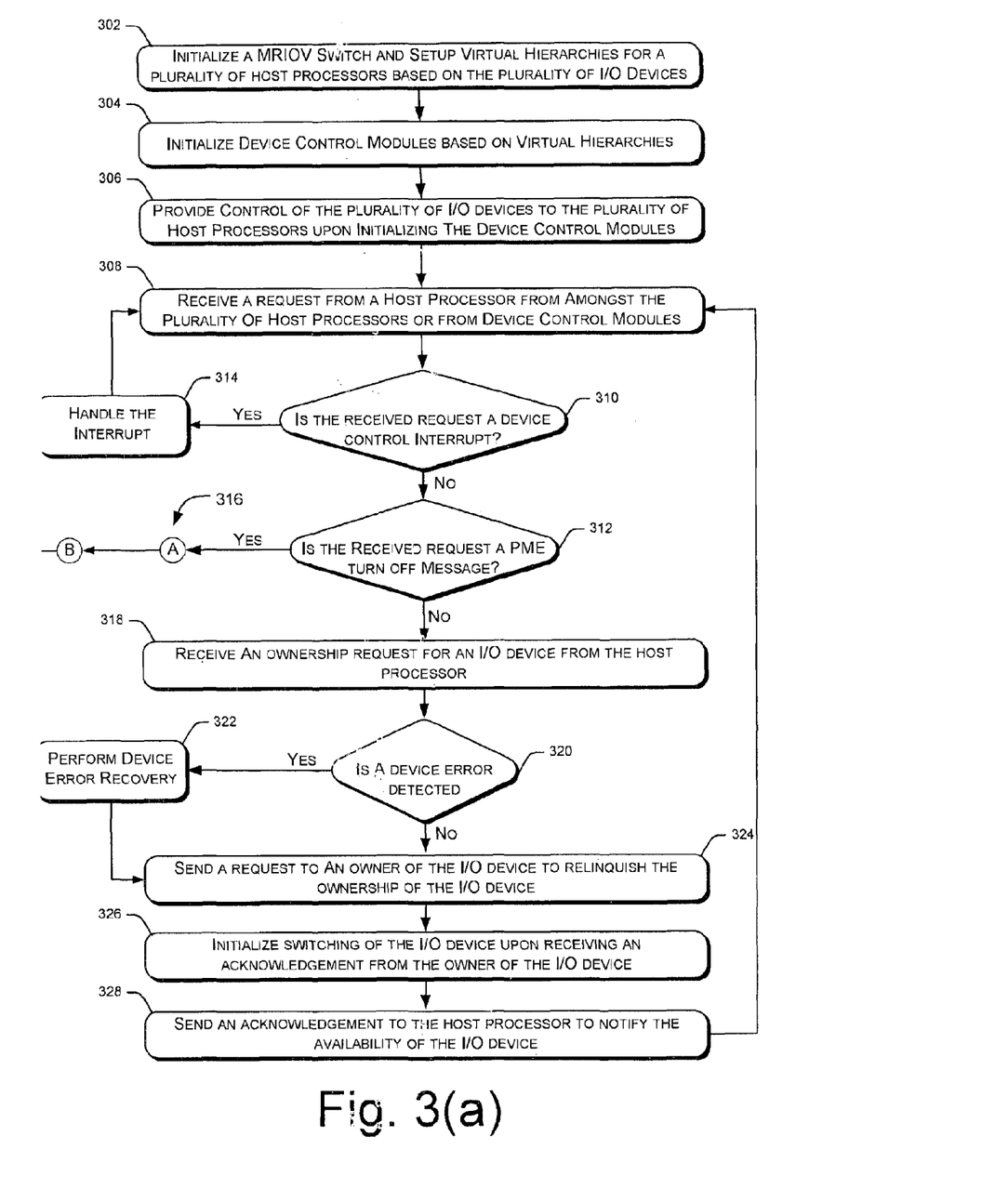
FIGS. 3(a) and 3(b) illustrate an exemplary method of virtualizing I/O devices and switching the command and I/O devices, in accordance with an embodiment of the present subject matter.
Figure 3B:
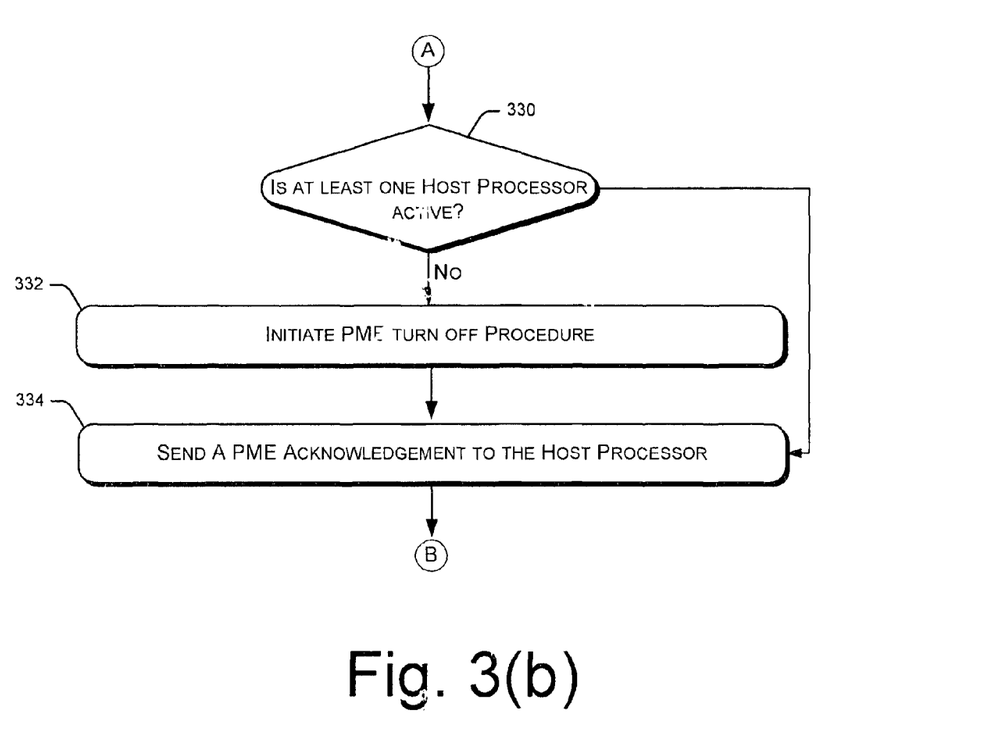

FIG. 3 illustrate an exemplary method 300 for virtualizing an I/O device and switching commands and I/O devices. The exemplary method 300 may be described in the general context of computer executable instructions embodied on a computer-readable medium. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300, or an alternative method. Additionally, individual blocks may be deleted from the method 300 without departing from the spirit and scope of the method, systems and devices described herein. Furthermore, the method 300 can be implemented in any suitable hardware, software, firmware, or combination thereof.

Additionally, the method 300 has been described from the context of the system 100 and the VSS 102 however, other embodiments may also be possible as will be understood by a person skilled in the art.

Referring to FIGS. 3(a) and 3(b), at block 302, the VSS 102 initializes a MRIOV switch and setup virtual hierarchies for a plurality of host processors based on the plurality of I/O devices. In situations where the PVC 204 acts as the MR-PCIM for the system, during the process, the PVC starts initializing the MP-MRIOV switch for the VSS 102 to set up each of the host virtual hierarchies.

As described above, the process is completed through the register programming of the MRIOV switch, in accordance with the PCI-SIG MRIOV standards. It would be understood by those skilled in the art, the PVC 204 may interface with the MRIOV switch through a custom interface or a standard PCIe interface depending upon the architecture of the MRIOV switch.

At block 304, the PVC may initialize device control modules based on the virtual hierarchies' setup at block 302. The PVC 204 may initialize the device control modules, such as the device control modules 206 according to the virtual hierarchies where the initialization may include, but not limited to, defining the default owner host processor of each I/O device 108 from amongst the plurality of host processors 104, implementing common configuration and device registers in accordance with common functionalities of the I/O devices across the plurality of host processors 104. For example, for an audio I/O device 108-1, the PVC may implement sampling frequency of the audio codec with respect to each host processor 104. Similarly, for a network controller, the PVC 204 may implement configuration registers defining different link speeds based on the different active host processors 104. Also, the PVC 204 may implement different clock frequencies corresponding to different host processors for different I/O device 108 depending upon the ownership of the host processor over the I/O device 108.

Further, during this process, the host processors 104 may also be denied access of the I/O devices 108. The access may be denied by keeping the host processors 104 in the reset mode, according to an implementation of the present subject matter.

At block 306, the PVC may provide the control of the I/O devices 108 to the plurality of host processors 104 upon initialization of the device control modules. As described above, the initialization of the device control module may include the identification of an owner host processor to each I/O device 108. Therefore, in one implementation, the PVC 204 may provide the control of the I/O device based on the identified owners. However, in another implementation of the present subject matter, the PVC may also provide the control of the I/O device 108 to multiple host processors 104 in order to share the I/O device 108 in parallel among the multiple host processors 108. As described at block 302, the host processors 104 denied access of the I/O devices 108 may be provided access of such I/O devices 108. For example, the host processor 104-1 and host processor 104-2 may be simultaneously provided access to the I/O device 108-1. Similarly, the host processor 104-2 may be provided with access of only one I/O device, such as the I/O device 108-2. It would be understood that the PVC 204 may deny the host processor 104-2, access to the other I/O devices 108 by disabling the host processor's 104-2 connectivity physically through the MRIOV aware switch 106 or the device control modules 206.

Further, in another implementation of the present subject matter, when all the host processors 104 are in active state and utilizing the system 102, depending on the host processor's 104 activity, PVC 204 may dynamically scale the frequencies of the device control module 206 & the I/O device 108 in order to provide dynamic power savings.

At block 308, the PVC 204 may receive a request from a host processor 104 or from a device control module 206. The host processors 104 may provide access requests, processing commands to the I/O devices 108. In said implementation, the PVC 204 may receive such a request from multiple host processors 104. In such a situation, the PVC 204 may arbitrate between the requests from the multiple host processors 104 to choose one request and provide it to the corresponding I/O device 108. Further, the PVC 204 may also receive interrupts generated by the I/O device 108. The interrupts generated by the I/O device 108 may be trapped by the device control modules 206 and provided to the PVC 204 at the block 308.

At block 310, it is determined if the request received at block 308 is a device control interrupt. In case the determination is positive, the control flows to block 314 ("Yes" branch). However, in case of a negative determination, the control flows to block 312 ("No" branch).

At block 314, the interrupt is handled. For example, the device control module 206 may generate an interrupt that may be a D-state program request. The device control module 206 generates such an interrupt whenever a D-state programming may be done by one of the host through the configuration registers. For example, when an I/O device 108 is shared across multiple hosts simultaneously and one of the host processor, such as the host processor 104-1 programs the device control module 206 to sent the I/O device 108 to a low power state (say D3-State), the device control module 206 may generate an interrupt for the PVC 204 indicating the host processor 104.

In such a situation, the PVC 204 may either determine to transition the device control module 206 of the I/O device 108, and the I/O device 108 to the D3-State or send a virtual "D3-state entered" status to the corresponding host processor 104-1. In one implementation, the determination is based on the overall system state. In case there are multiple host processors 104 actively accessing the peripheral, the PVC 204 will program the device controller to provide a virtual D3-State entered status to the host.

In general, a PME Turn-Off request is a broadcast message defined by the PCIe specification. A host transitioning to shut down state broadcasts this message to all the attached PCIe I/O devices. Whenever a "PME Turn Off" message is received by the device controllers, the device controllers stop all the ongoing transfers with the attached devices and send a "PME ACK" message to the host. Once the host receives acknowledgement from all the attached PCIe devices, it shuts down the power to the complete system.

Therefore, at block 312, it is determined if the request received at block 308 is a PME turn-off request. In case the determination is positive, the control flows to block 316 ("Yes" branch). However, in case of a negative determination, the control flows to block 318 ("No" branch). In case the determined request is neither an interrupt generate by the device control module, nor a PME turn-off request, the PVC identifies the request to be an ownership request from the host processor 104 for an I/O device 108 at block 318.

Upon identifying the request to be an ownership request from the host processor 104 for an I/O device 108, the PVC 204 determines if an error is detected in the I/O device 108, at block 320. In case the determination is positive, the control flows to block 322 ("Yes" branch). However, in case of a negative determination, the control flows to block 324 ("No" branch). In case an error is detected in the I/O device 108, such as the I/O device 108 has become non responsive and gone into a hang situation, the PVC 204 may start a performing a device error recovery mechanism. In one implementation, the PVC 204 initiates a restart or reloading of the I/O device 108 by sending a restart signal to the owner of the I/O device 108. The owner host processor of the I/O device 108 may then reload the device drivers corresponding to the I/O device 108 to complete the error recovery mechanism. In yet another implementation, the error recovery mechanism may include a reset of the device control module corresponding to the I/O device 108.

Once the error recovery mechanism is complete, the control flows to block 324. As described before, in case a device error is not determined at block 320, the control also flows to block 324. At block 324, a request to relinquish the I/O device 108 is sent to the owner host processor 104 of the I/O device. In one implementation, the request may be sent as a disconnect message from the PVC 204 to the owner host processor 104.

At block 326, PVC 204 may start updating the device control module 206 of the I/O device 108 to initialize the I/O device 108 for the host processor from which the request has been received at block 318. The PVC may initialize multiple set of registers to start shifting the I/O device 108 ownership to the requesting host processor, upon receiving an acknowledgment from the owner. It would be appreciated that the process of switching initialization may include virtual I/O device 108 plug off.

At block 328, an acknowledgement of the successful switching of the I/O device 108 is send to the requesting host processor 104 to notify the availability of the I/O device 108. As would be understood by those skilled in the art, upon switching the I/O device 108, the PVC 204 may provide the direct flow control of the information between the host processor 104 and the I/O device 108.

As described at block 312, in case it is determined that the request received from the host processor 104 is a PME turn-off request, the control flows to the block 316. The block 316 may include determining active state of at least one host processor 104 at block 330. In case the determination is negative, the control flows to block 332 ("No" branch). However, in case of a positive determination, the control flows to block 334 ("Yes" branch).

At block 332, the PVC 204 may initiate a PME turn-off procedure. During this procedure, all the device control modules 206 may be signalled a PME turn-off event. Upon receiving such a signal from the PVC 204, the device control modules 206 may initiate a process of transitioning the attached I/O device 108 to a quiescent state by stopping all the ongoing data transfers. Once all the I/O devices 108 are in quiescent state, the PVC 204 may send a PME acknowledgement to the corresponding host processor 104, at the block 334.

Although implementations of a virtualization and switching system have been described in language specific to structural features and/or methods, it is to be understood that the invention is not necessarily limited to the specific features or methods described. Rather, the specific features and methods are disclosed as exemplary implementations for the virtualization and switching system.

We claim:

1. A method comprising:
   initializing one or more of at least one configuration register set, and at least one device register set for a I/O device, wherein each of the at least one configuration register set and the at least one device register set correspond to a host processor from amongst a plurality of host processors, and wherein each of the at least one configuration register set and the at least one device register set also correspond to the I/O device; and
   providing the initialized configuration registers and the device registers to the plurality of host processors for virtualization of the I/O device:
   assigning the I/O device to a first host processor from amongst the plurality of host processors to process a request from the first host processor;
   queuing requests for the I/O device from host processors other than the first host processor amongst the plurality of host processors, wherein the queuing further comprises sending acknowledgements to the host processors in response to each of the requests; and
   arbitrating the queued requests to choose a next request upon completion of a first request from the first host processor;
   wherein the plurality of host processors identify the virtualized I/O device as a dedicated device.

2. The method as claimed in claim 1, wherein the method further comprises:
   parsing requests from the plurality of host processors for the I/O device to identify command boundaries; and
   arbitrating between the requests from the plurality of host processors based at least on the identified command boundaries.

3. The method as claimed in claim 2, wherein the arbitrating further comprises virtually disconnecting the I/O device from a host processor based on the identified command boundaries.

4. The method as claimed in claim 1, wherein the method further comprises tapping at least one of a connect event, and a disconnect event associated with the I/O device for updating one or more of the at least one configuration register set, and the at least one device register set corresponding to the plurality of host processors.

5. The method as claimed in claim 4, wherein the method further comprises sending the at least one of the connect event, and the disconnect event to at least one host processor from amongst the plurality of host processors.

6. A system comprising:
   at least one device control module configured to implement at least one of configuration register set and at least one device register set for an I/O device corresponding to one or more virtual hierarchies, wherein the virtual hierarchies are associated with a plurality of host processors.
   at least one command parser coupled to the at least one device control module configured to identify command boundaries of requests from the plurality of host processors based on packet header of the requests, wherein a request from a second host processor, from the plurality of host processors, is queued while command boundaries for a first host processor, from the plurality of host processors, are identified, wherein an acknowledgement is sent to the second host processor along with queuing of the request; and
   a peripheral virtualization controller (PVC) coupled to the at least one device control module configured to:
   control virtualization of the I/O device; and
   control power state of at least one of the device control module and the I/O device based on the power state settings configured by the plurality of host processors.

7. The system as claimed in claim 6, wherein the PVC is further configured to initialize at least one of the configuration registers and at least one of the device registers common for the virtual hierarchies.

8. The system as claimed in claim 6, wherein the PVC is further configured to implement clock frequency of operation of the I/O device in accordance with each of the plurality of host processors.

9. The system as claimed in claim 6, wherein the PVC is further configured to update the at least one device control module to switch the I/O device between the plurality of host processors.

10. The system as claimed in claim 6, wherein the at least one device control module is further configured to switch the I/O device between the plurality of host processors based on the command boundaries.

11. The system as claimed in claim 6, the system further includes a message handling module configured to:
    support communication among the plurality of host processors; and
    enable communication between the plurality of host processors and the PVC.

12. The system as claimed in claim 6, wherein the PVC is further configured to act as a multi root PCI manager (MR-PCIM).

13. The system as claimed in claim 6, wherein the PVC is further configured to manage error conditions of the I/O devices among the plurality of host processors.

14. The system as claimed in claim 6, wherein the PVC is one of a host processor from amongst the plurality of host processors.

15. The system as claimed in claim 6, wherein the PVC is further configured to handle system level power management events based on active state of the host processors.

16. A system comprising:
a device control module configured to:
assign an I/O device to a first host processor from amongst the plurality of host processors to process a first request from the first host processor;
wherein the assigning includes associating a configuration register set and a device register set with the first host processor, from amongst at least one configuration register set and at least one device register set implemented for virtualization of the I/O device;
receive a second request from a second host processor from amongst the plurality of host processors for the virtualized I/O device;
queue the second request for the virtualized I/O device from the second host processor, wherein an acknowledgement is sent to the second host processor along with queuing of the second request;
arbitrate between the first request and the second request to select the second request based on the command boundary of the first request; and
assign the virtualized I/O device to the second host processor to process the second request, wherein the assigning includes associating another configuration register set and another device register set for the virtualized I/O device, with the second host processor, and the virtualized I/O device is simultaneously shared between the first host processor and the second host processor, and wherein the first host processor and the second host processor identify the virtualized I/O device as a dedicated device.

17. A system comprising:
a device control module configured to receive a first request for a virtualized I/O device from a first host processor from amongst the plurality of host processors;
process the first request for the virtualized I/O device from the first host processor;
receive a second request for the virtualized I/O device from a second host processor from amongst the plurality of host processors;
queue the second request for the virtualized I/O device from the second host processor, wherein an acknowledgement is sent to the second host processor along with queuing of the second request; and
assign the virtualized I/O device to the second host processor upon complete processing of the first request, wherein the virtualized I/O device is disconnected from the first host processor, wherein the assigning includes associating at least one of a configuration register set and a device register set corresponding to the virtualized I/O device with the second host processor and wherein the first host processor and the second host processor identify the virtualized I/O device as a dedicated device.

18. The system as claimed in claim 17, wherein the assigning comprises:
sending a request to the first host processor to relinquish the control of the I/O device;
initiating a switch of the I/O device from the first host processor to the second host processor upon receiving an acknowledgement from the first host processor; and
providing an acknowledgement to the second host processor upon completion of the switching, wherein the acknowledgement is indicative of the assignment of the I/O device to the second host processor.

\* \* \* \* \*